(12) United States Patent
Finger et al.

(10) Patent No.: US 10,529,067 B1
(45) Date of Patent: Jan. 7, 2020

(54) METHOD AND GRAPHIC USER INTERFACE FOR INTERACTIVELY DISPLAYING DIGITAL MEDIA OBJECTS ACROSS MULTIPLE COMPUTING DEVICES

(71) Applicant: Alchephi LLC, Wilmington, DE (US)

(72) Inventors: Deva Finger, Miami Beach, FL (US); Sawyer Keith Waugh, Southampton, PA (US)

(73) Assignee: Alchephi LLC, Wilmington, DE (US)

( * ) Notice: Subject to any disclaimer, the term of this patent is extended or adjusted under 35 U.S.C. 154(b) by 0 days.

(21) Appl. No.: 16/549,833

(22) Filed: Aug. 23, 2019

(51) Int. Cl.
| G06K 9/00 | (2006.01) |
| G06K 9/60 | (2006.01) |
| G06K 9/62 | (2006.01) |
| G06T 7/00 | (2017.01) |
| G06K 9/46 | (2006.01) |

(52) U.S. Cl.
CPC .......... G06T 7/0002 (2013.01); G06K 9/4609 (2013.01); G06K 9/623 (2013.01); G06T 2207/30168 (2013.01)

(58) Field of Classification Search
None
See application file for complete search history.

(56) References Cited

U.S. PATENT DOCUMENTS

| 9,164,979 | B1 * | 10/2015 | Dubey | G06F 17/27 |
| 2011/0307425 | A1 * | 12/2011 | Wang | G06F 16/9038 706/12 |
| 2012/0044262 | A1 * | 2/2012 | Hirai | G06T 7/001 345/629 |
| 2012/0109845 | A1 * | 5/2012 | Triplett | G06Q 40/06 705/36 R |
| 2014/0323817 | A1 * | 10/2014 | el Kaliouby | A61B 5/165 600/300 |
| 2015/0356093 | A1 * | 12/2015 | Abbas | G06F 16/44 707/748 |
| 2016/0004224 | A1 * | 1/2016 | Pi | G04G 21/025 368/10 |
| 2016/0316268 | A1 * | 10/2016 | Carmichael | H04N 21/4662 |
| 2016/0335683 | A1 * | 11/2016 | Roberts | G06Q 30/0282 |
| 2017/0026613 | A1 * | 1/2017 | Lee | G06Q 10/06398 |
| 2017/0078225 | A1 * | 3/2017 | Pandey | H04L 51/046 |
| 2017/0280196 | A1 * | 9/2017 | Thomas | H04N 21/4532 |
| 2018/0018351 | A1 * | 1/2018 | Fagans | G06Q 10/10 |

(Continued)

*Primary Examiner* — Randolph I Chu
(74) *Attorney, Agent, or Firm* — Andriy Lytvyn; Smith & Hopen, P.A.

(57) ABSTRACT

A method and a graphic user interface for displaying digital media objects and dynamically calculating their quality indicators. A first digital media object is displayed on a first computing device. A first user provides one of predefined inputs corresponding either to a positive or a negative response to the first digital media object. The quality indicator of the first digital media object is increased if the response is positive and decreased if the response is negative. The amount of increase or decrease is calculated based on a coefficient value associated with the first user. Subsequent responses to the first digital media object from other users impact the quality indicator of the first digital media object and, also, impact the coefficient value of the first user. Updated coefficient value of the first user is used to calculate impact of subsequent responses of the first user to other digital media objects.

19 Claims, 13 Drawing Sheets

(56) References Cited

U.S. PATENT DOCUMENTS

| | | | |
|---|---|---|---|
| 2018/0027296 A1* | 1/2018 | Lea | H04N 21/475 |
| | | | 725/50 |
| 2018/0035938 A1* | 2/2018 | el Kaliouby | G06Q 10/101 |
| 2018/0098125 A1* | 4/2018 | Bender | H04N 21/4756 |
| 2018/0101549 A1* | 4/2018 | Murphy-Chutorian | |
| | | | G06F 16/5838 |
| 2018/0121733 A1* | 5/2018 | Joshi | G06K 9/00744 |
| 2018/0183886 A1* | 6/2018 | Newell | H04L 65/1069 |
| 2019/0028749 A1* | 1/2019 | Kim | H04N 21/252 |
| 2019/0073547 A1* | 3/2019 | el Kaliouby | G06N 3/0445 |
| 2019/0279241 A1* | 9/2019 | DiTomaso | G06F 16/27 |
| 2019/0279346 A1* | 9/2019 | Zhang | G06T 5/50 |
| 2019/0286756 A1* | 9/2019 | Sweeney | G06F 16/9537 |
| 2019/0289697 A1* | 9/2019 | Meerbeek | G06F 16/587 |
| 2019/0294759 A1* | 9/2019 | Whiffen | G06F 21/105 |
| 2019/0294997 A1* | 9/2019 | Tofighbakhsh | H04N 21/2668 |
| 2019/0297039 A1* | 9/2019 | Rodriguez | H04L 65/1093 |
| 2019/0306557 A1* | 10/2019 | Miller | H04N 21/41422 |
| 2019/0311067 A1* | 10/2019 | Waye | G06F 16/435 |
| 2019/0320113 A1* | 10/2019 | Rajvanshi | G06K 9/6215 |

\* cited by examiner

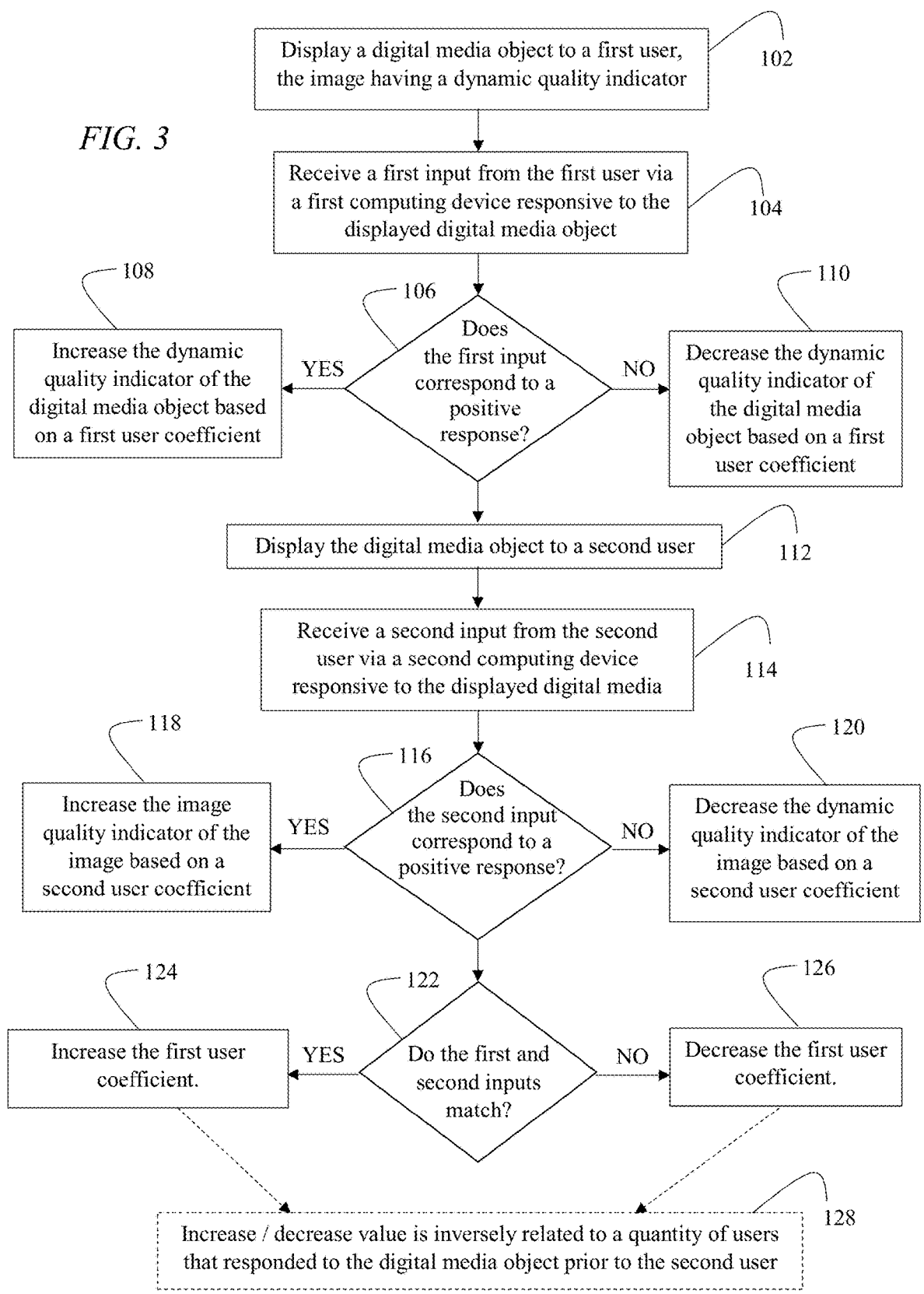

METHOD AND GRAPHIC USER INTERFACE FOR INTERACTIVELY DISPLAYING DIGITAL MEDIA OBJECTS ACROSS MULTIPLE COMPUTING DEVICES

BACKGROUND OF THE INVENTION

1. Field of the Invention

This invention relates generally to the fields of computer graphic user interfaces and digital photography and videography. Specifically, the invention pertains to a method of interactively displaying digital media objects across multiple computing devices.

2. Brief Description of the Related Art

Digital photography and videography are technological fields that are inseparably intertwined with computing devices and graphic user interfaces used to display audiovisual content thereon. Modern smartphones, tables, laptop and desktop computers, smart televisions, and augmented reality devices have high resolution screens for viewing digital images and videos. Creators of digital audiovisual content have a need to digitally disseminate their content to multiple computing devices belonging to multiple users. There exists a need for interactive display of digital media object on graphic user interfaces of computing devices, such that the users viewing the digital photographs can contribute to the quality assessment of those digital media objects.

There also exists a need for an automated control function that dynamically adjusts a quality indicator associated with the audiovisual content based on user responses. Furthermore, there exists a need for a technological solution that provides an automated closed-loop mechanism that increases or decreases an impact of a user's subsequent responses on a quality indicator of a digital media object based on whether an existing response coincides with responses from subsequent users. There is also a need for a technological solution that automatically imposes a checks-and-balances system on a user's ability to impact the quality indicator of audiovisual content, such the providing responses that are dissonant with subsequent responses from other users diminishes one's ability to impact the quality indicators of digital media. Moreover, there exists a pressing need for a technological solution that automatically identifies users who statistically recognize high-quality or low-quality audiovisual content prior to other users, whereby input from those early users is weighed more heavily than input from other users.

Finally, graphic user interfaces for displaying digital media objects uploaded by multiple content creators generally display the digital media objects in a chronological order or in an order of estimated pertinence to a viewer. These graphic user interfaces do not have a capability of arranging displayed digital media objects based on their dynamic quality indicators, such that the viewer is always presented with the digital media objects having the highest dynamic quality indicators first. Thus, there exists a need for a graphic user interface for displaying a plurality of digital media objects in a predefined order, such that the digital media objects having the highest image quality indicators always occupy the primary display area of the display screen of a computing device, wherein the graphic user interface automatically rearranges the digital media objects responsive to changes of their dynamic quality indicators.

SUMMARY OF THE INVENTION

The pressing but heretofore unresolved problems described above are now addressed by a novel and non-obvious invention. The invention pertains to a method and a graphic user interface for displaying digital media objects on a computing device. The term "digital media objects" as used herein, refers to audiovisual content, such as digital photographs, drawings, vector renderings, video clips, audio clips, three-dimensional models, alphanumerical text, etc. In an embodiment, a first digital media object is displayed on a display screen of a first computing device. The first digital media object has a dynamic quality indicator associated therewith. In an embodiment, the dynamic quality indicator is a numerical value associated with the digital media object.

In an embodiment, the first computing device is configured to receive an input from a first user responsive to the first digital media object being outputted on the first computing device. The input is selected from a plurality of predefined inputs, which include at least a first predefined input and a second predefined input. The first predefined input corresponds to a positive response, while the second predefined input corresponds to a negative response. The first user has a coefficient value associated therewith. The dynamic quality indicator of the first digital media object is automatically updated responsive to the first user's input. The updated dynamic quality indicator is calculated based on the coefficient value of the first user.

Subsequently, the same first digital media object is outputted on a second computing device. The second computing device is configured to receive either the first predefined input or the second predefined input from a second user in response to the first digital media object. The second user has a coefficient value associated therewith. The input received from the second user in response to the first digital media object affects the dynamic quality indicator of the first digital media object and, also, affects the coefficient value of the first user. The coefficient value associated with the first user is increased if the second user provides the same predefined input in response to the first digital media object as the first user. On the other hand, the coefficient value associated with the first user is decreased if the second user provides a different predefined input in response to the first digital media object than the predefined input provided by the first user. When the first user subsequently responds to a second digital media object, an increase or decrease of the dynamic quality indicator of the second digital media object is calculated based on the updated coefficient value of the first user.

In an embodiment, the coefficient value of the first user is increased by a first value if the first user and the second user both provided positive responses to the first digital media object, and, the coefficient value of the first user is increased by a second value if the first user and the second user both provide negative responses to the first digital media object. In an embodiment, the impact of matching negative responses may be greater than the impact of matching positive responses. In an embodiment, the impact of matching negative responses—i.e., the second value—is calculated as a function of a governing coefficient. The governing coefficient may be calculated as a ratio of positive and negative responses across all users systemwide, across a select group of users, or for an induvial user. The governing coefficient may be configured to stay within boundaries of predefined threshold values. In an embodiment, the governing coefficient is such that the impact of matching negative responses (the second value) can never fall below the impact of matching positive responses (the first value).

In an embodiment, the impact of the second user's response to the first digital media object on the coefficient value of the first user is calculated based on a quantity of responses to the first digital media object from other users prior to the response provided by the second user. The impact may be inversely proportional to a total number of users that have responded to the first digital media object prior to the second user.

In an embodiment, matching negative responses from the first user and the second user may have a greater positive impact on the first user's coefficient value than a positive impact that matching positive responses would have had, as discussed above. This difference may be calculated based on cumulative positive and negative responses previously provided to all digital media objects and across all users systemwide.

In an embodiment, the graphic user interface of a computing device is configured to arrange digital media objects based on the values of their dynamic quality indicators. The digital media objects are rearranged when the values of the dynamic quality indicators change responsive to the first or the second input received from the second user.

BRIEF DESCRIPTION OF THE DRAWINGS

For a fuller understanding of the invention, reference should be made to the following detailed disclosure, taken in connection with the accompanying drawings, in which:

FIG. 3 is a flowchart schematically illustrating a method of dynamically calculating an updated image quality indicator an updated user coefficient according to an embodiment of the invention.

DETAILED DESCRIPTION OF THE PREFERRED EMBODIMENT

Figure 1:
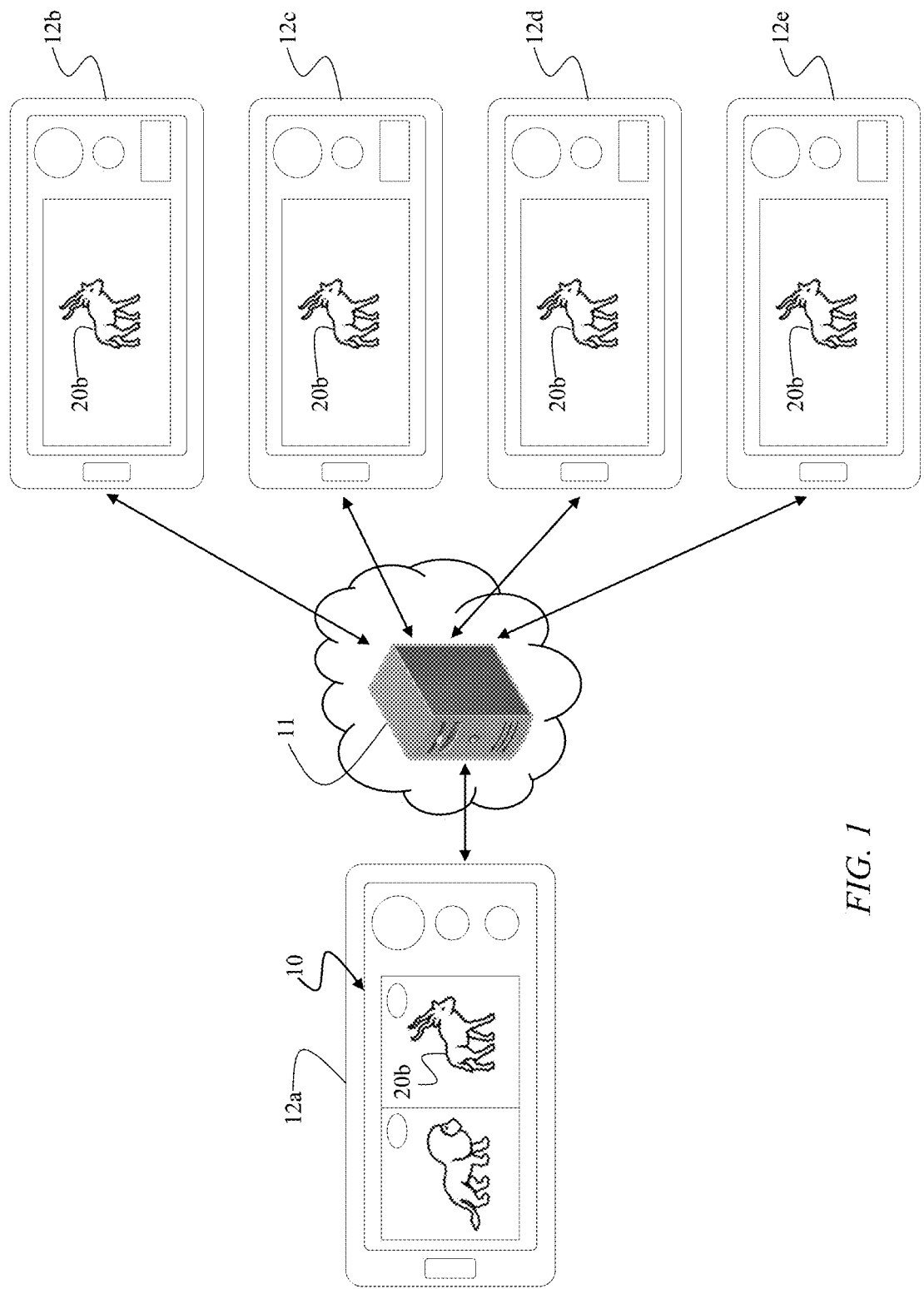
FIG. 1 schematically depicts interconnection between a digital media object quality assessment function and a plurality of users.

In an embodiment, the invention pertains to an application deployed across multiple computing devices belonging to multiple users. Referring to FIG. 1, application 10 is deployed on a first computing device 12a. In an embodiment, application 10 communicates with a digital media quality assessment function, which may be hosted on a server 11 or on one or more computing devices. Computing device 12a may communicate with server 11 over a network connection, such as over the Internet, a cellular network, a local area network, a wireless local area network, etc. Server 11 also communicates with a plurality of other computing devices including a second computing device 12b, a third computing device 12c, a fourth computing device 12d, and a fifth computing device 12e. An instance of application 10 is deployed on each of those computing devices.

When a user uploads a digital media object 22b via the application 10 deployed on first computing device 12a, digital media object 22b becomes accessible to computing devices 12b, 12c, 12d, and 12e. For the sake of simplicity, the following disclosure will use a digital photograph 22b as an example. However, it should be appreciated that digital photographs are merely exemplary, and the term "digital media objects," as used herein, refers to audiovisual content, which is a broad category that includes digital photographs, drawings, vector renderings, video clips, audio clips, three-dimensional models, alphanumerical text, etc. When digital photograph 22b is displayed on the graphic user interface of computing devices 12b, 12c, 12d, and 12e, users of those computing devices can provide their input in response to digital photograph 22b. Their input is used to automatically update the dynamic quality indicator of digital photograph 22b. As described in more detail below, the input of each user is weighed based on a coefficient associated with that user. Furthermore, when a user provides a positive or a negative response to digital photograph 22b, the coefficient associated with that user becomes subjected to automatic adjustments based on subsequent responses to photograph 22b received from other users.

In this manner, the impact of a response from any given user on a quality indicator of a digital media object is calculated based on a historic record of that user providing responses to digital media objects that are corroborated by subsequent responses from other users. Users that consistently provide responses that conflict with responses form subsequent users will have low coefficients and their responses to digital media objects will have little impact on the dynamic image quality indicators of those digital media objects. The converse is also true: users whose responses are consistently corroborated by subsequent responses from other user will have high coefficients, and their responses to digital media objects will have a more significant impact on values of dynamic quality indicators of those digital media objects. This automated closed-loop function provides a technological self-regulating mechanism for ensuring that outliers cannot significantly—negatively or positively—affect the dynamic quality indicators of digital media objects.

Figure 2A:
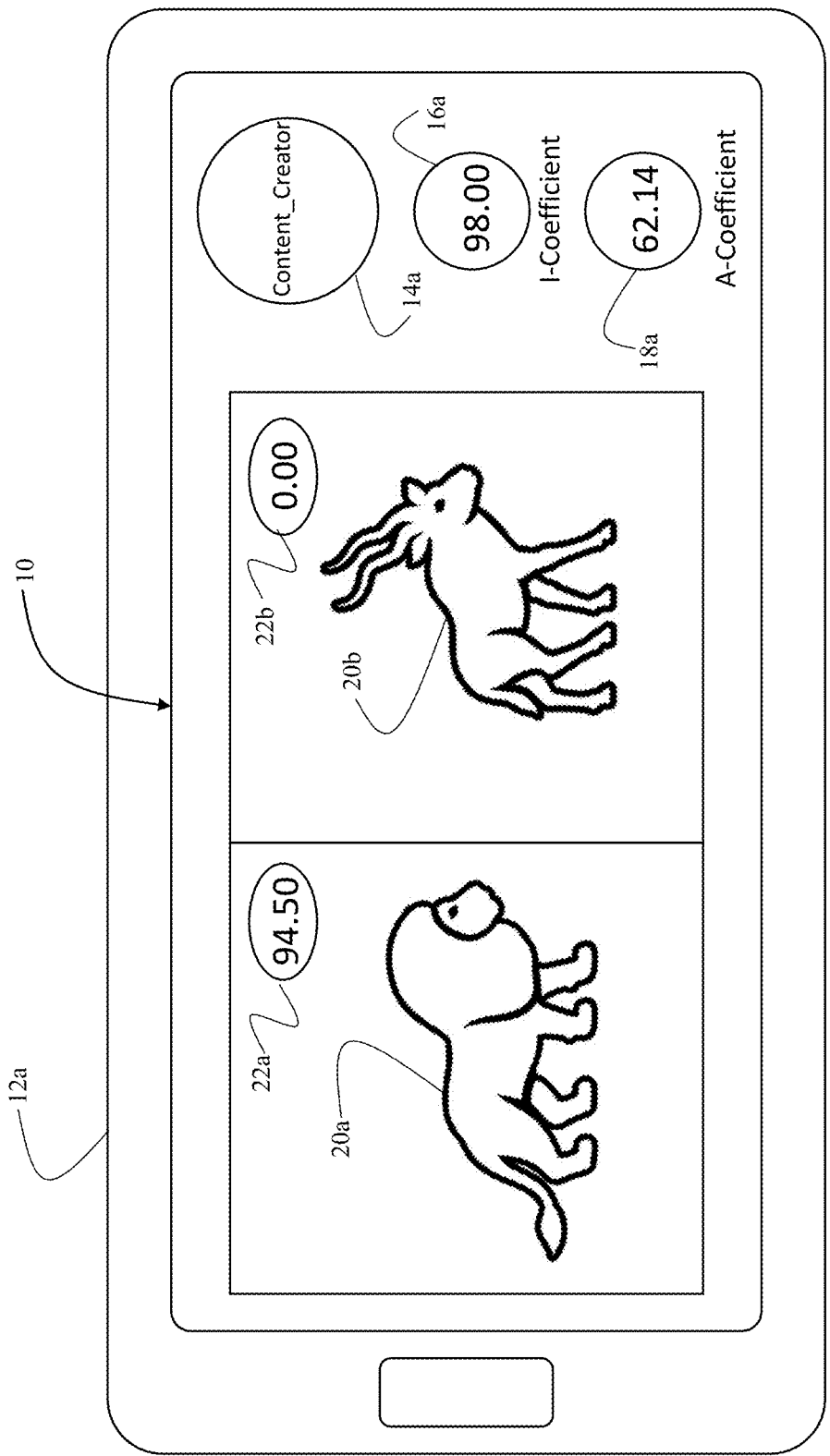
FIG. 2A schematically depicts a first computing device displaying a graphic user interface displaying digital photographs uploaded by a content creator.

FIGS. 2A-2K depict a sequence of events illustrating several aspects of the invention. Referring to FIG. 2A, application 10 includes a graphic user interface for displaying digital photographs 20a and 20b. Application 10 has a quality assessment mechanism associated therewith for providing dynamic quality indicators 22a and 22b for digital media objects, such as photographs 20a and 20b. In an embodiment, dynamic quality indicators 22a and 22b are numerical values calculated using inputs detected from multiple users across multiple computing devices responsive to digital photographs 20a and 20b being displayed on their computing devices.

FIG. 2A depicts a computing device 12a. Application 10 is deployed on computing device 12a. Application 10 has a graphic user interface displaying a screen view associated with a user 14a (Content_Creator). Content_Creator is the author of digital photographs 20a and 20b, which he has uploaded to one or more servers via the network connection using application 10. Digital photograph 20a is a photograph of a lion. Digital photograph 20a has been uploaded for some time and currently has a dynamic quality indicator 22a of "94.50." Digital photograph 20b is a photograph of a gazelle. Digital photograph 20b has been uploaded recently and has an initial dynamic quality indicator 22b of "0.00." Dynamic quality indicators 22a and 22b change dynamically based on input from other users responsive to digital photographs 20a and 20b being displayed on their computing devices by application 10 deployed thereon.

FIG. 2A also depicts I-Coefficient 16a associated with Content_Creator. I-Coefficient 16a is used as a weight factor if Content_Creator were to provide an input responsive to other users' digital photographs. I-Coefficient of each user is dynamically adjusted based on input from other users, as explained in more detail below. Application 10 may also include an A-Coefficient 18a. A-Coefficient 18a is calculated as a factor of an average dynamic quality indicator across all digital media objects uploaded by a user relative to average dynamic quality indicators of digital media objects uploaded by other users.

When Content_Creator uploads digital photograph 20b to application 10, digital photograph 20b is visually displayed on computing devices of other users of application 10, as depicted in FIGS. 2B, 2D, 2F, and 2J.

Figure 2B:
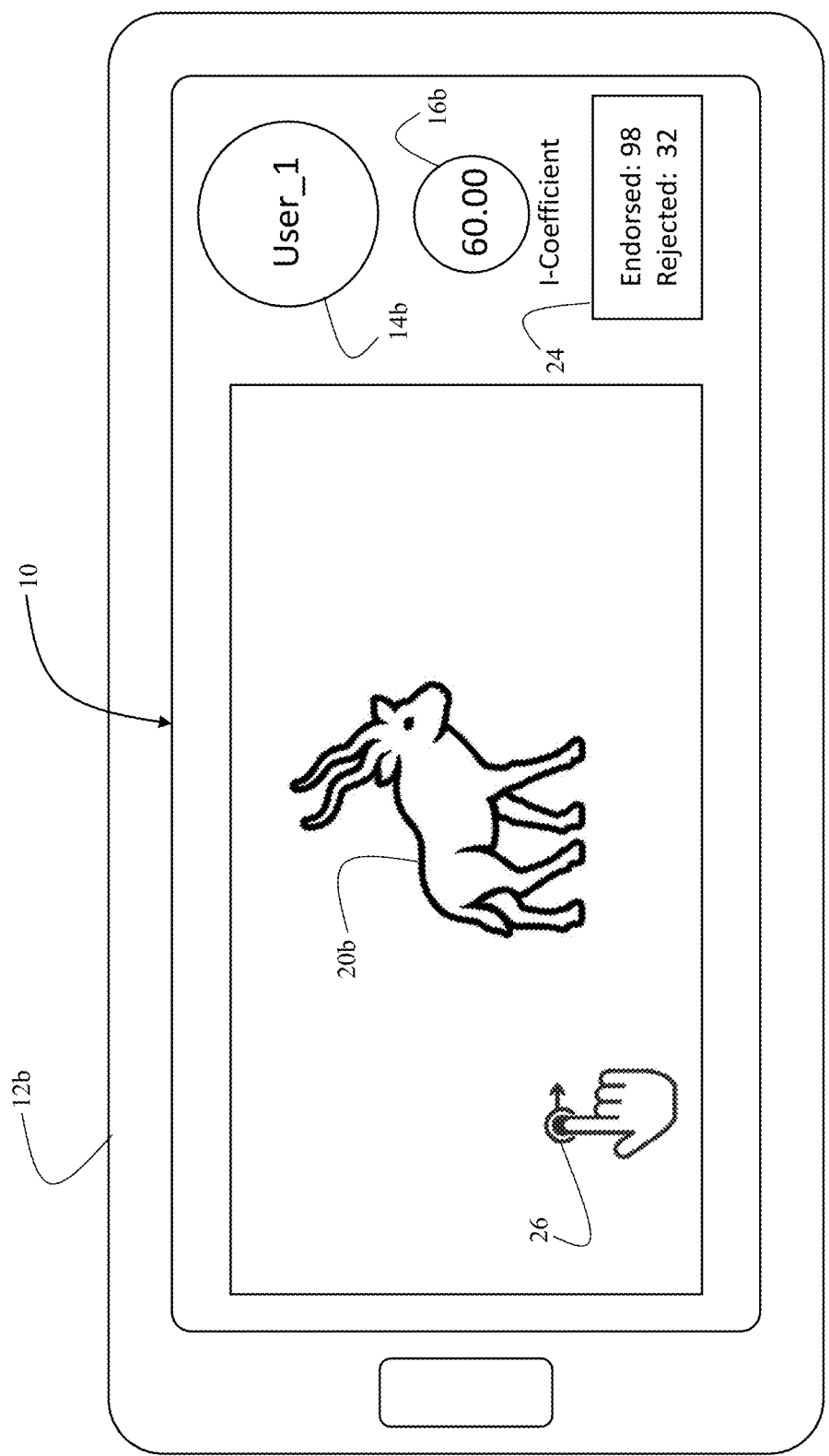
FIG. 2B schematically depicts a second computing device displaying a digital photograph and configured to receive a predefined input from a first user in response thereto.

FIG. 2B depicts a second computing device 12b being used by user 14b (User_1). A second instance of application 10 is deployed on second computing device 12b. The graphic user interface of application 10 is used to output digital photograph 20b onto the screen of second computing device 12b. Second computing device 12b may be equipped with a touchscreen configured to detect various touch inputs. Responsive to digital photograph 20b being displayed on second computing device 12b, User_1 can provide a first predefined input 26 (for example, right swipe, virtual button tap, physical button press, etc.) endorsing digital photograph 20b or User_1 can provide a second predefined input 28 (for example, left swipe, virtual button tap, physical button press, etc.) (not depicted in FIG. 2B) rejecting digital photograph 20b. Other input methods can be used without departing from the scope of the invention, some of which may include: touch input, gestures, physical movement of the computing device, selection of an onscreen control element, pressing of a physical button on the computing device, verbal commands, facial expression commands, eye movement commands, and input provided via a peripheral device, such as a keyboard, a mouse, or a smartwatch. In an embodiment, the computing device is equipped with a touch screen, an accelerometer, a gyroscope, a camera, a microphone, a light sensor, a proximity sensor, mechanical buttons or switches, or a combination thereof for detecting the predefined inputs.

FIG. 2B depicts that computing device 12b detects first predefined input 26 from User_1 responsive to digital photograph 20b being displayed on computing device 12b. First predefined input 26 indicates that User_1 endorses digital photograph 20b. FIG. 2B further depicts that User_1 has I-Coefficient 16b of "60.00." I-Coefficient 16b is used as an input to calculate current dynamic quality indicator 22b of digital photograph 20b. FIG. 2B also depicts input history 24 of User_1. Responsive to second computing device 12b detecting user input responsive to digital photograph 20b, dynamic quality indicator 22b associated with image 20b is dynamically updated, as depicted in FIG. 2C.

Figure 2C:
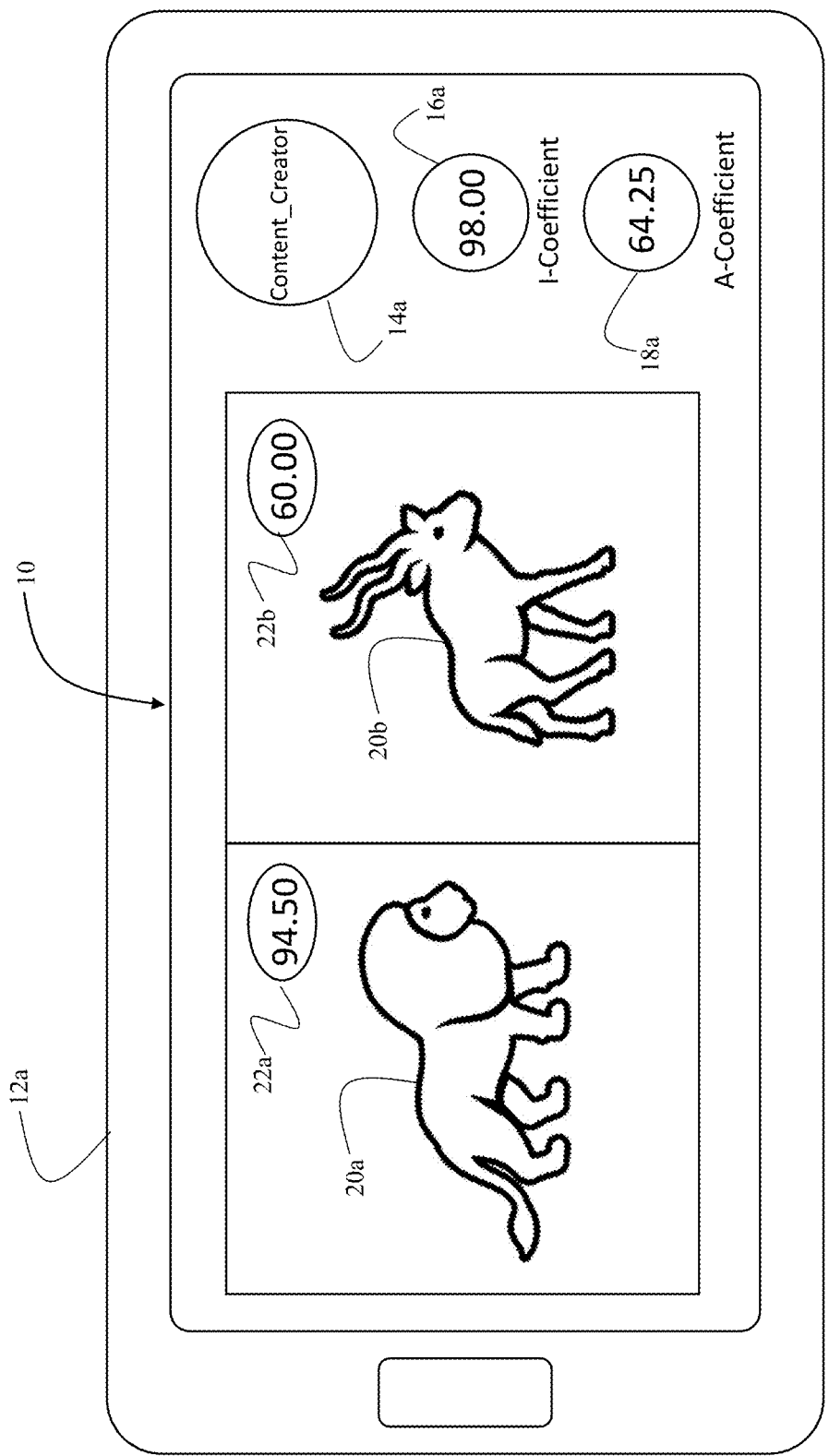
FIG. 2C schematically depicts the first computing device displaying an updated dynamic image quality indicator for the digital photograph subsequent to receiving an input from the first user.

FIG. 2C depicts first computing device 12a displaying digital photographs 20a and 20b uploaded by Content_Creator. When digital photograph 20b was initially uploaded, as depicted in FIG. 2A, it had an initial dynamic quality indicator 22b of "0.00." (It should be noted that the 0.00 value is merely exemplary, and a different predefined default value can be assigned to an uploaded digital photograph.) Responsive to second computing device 12b detecting first predefined input 26 from User_1 endorsing digital photograph 20b, dynamic quality indicator 22b associated with digital photograph 20b automatically increases. The increase is calculated as a factor of I-Coefficient 16b of User_1. For the sake of simplicity, in this example, dynamic quality indicator 22b is calculated as a difference of a sum of all I-Coefficients of users that have responded to second digital photograph 20b with first predefined gesture 26 and a sum of all I-Coefficients of users that have responded to second digital photograph 20b with a second predefined gesture 28. Other algorithms for calculating dynamic quality indicator 22b as a factor of I-Coefficients of users that have responded to second digital photograph 20b may be implemented without departing from the scope of the invention.

Continuing reference to FIG. 2C, responsive to second computing device 12b receiving first predefined input 26 from User_1 responsive to digital photograph 20b, dynamic quality indicator 22b is increased based on I-Coefficient 16b of User_1. Based on the exemplary algorithm described above, dynamic quality indicator 22b of digital photograph 20b increases from its initial value of "0.00" by I-Coefficient 16b of User_1 and becomes "60.00."

A-Coefficient 18a of Content_Creator is also increased because it is a factor of an average dynamic quality indicator of the digital photographs uploaded by Content_Creator. I-Coefficient 16a of Content_Creator is unaffected by input received from User_1 responsive to digital photograph 20b because Content_Creator did not provide his own input responsive to digital photograph 20b prior to the input provided by User_1 (dynamic changes to I-Coefficients based on subsequent user input responsive to a digital photograph will be explained in more detail below).

Figure 2D:
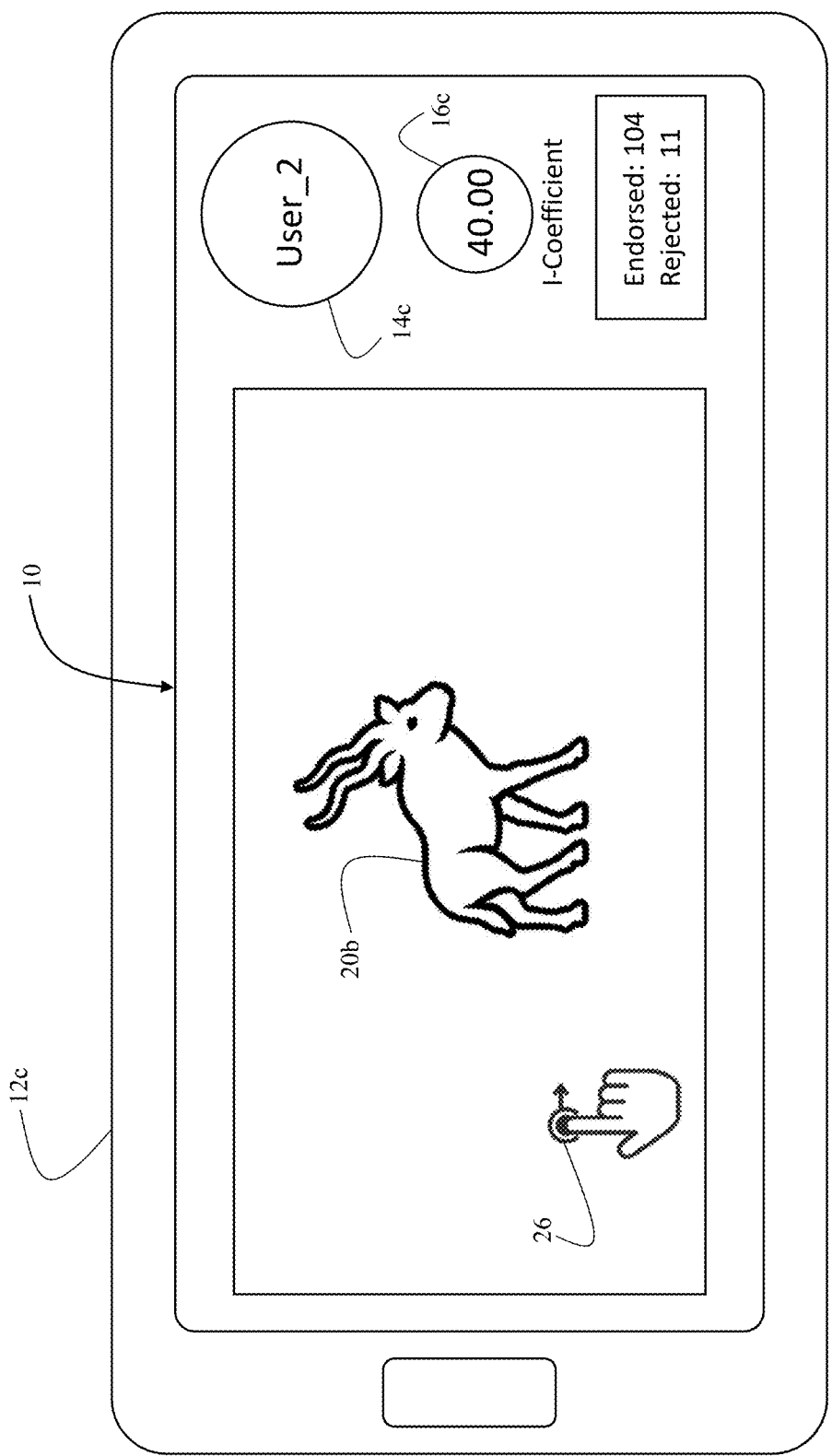
FIG. 2D schematically depicts a third computing device displaying the digital photograph and configured to receive a predefined input from a second user in response thereto.

FIG. 2D depicts a third computing device 12c with application 10 deployed thereon. Application 10 displays photograph 20b on the screen of third computing device 12c. Third computing device 12c detects first predefined input 26 from user 14c—i.e., User_2—responsive to digital photograph 20b, indicating endorsement thereof. I-Coefficient 16c associated with User_2 is "40.00." The changes that automatically occur responsive to first predefined input 26 from User_2 are shown in FIG. 2E.

Figure 2E:
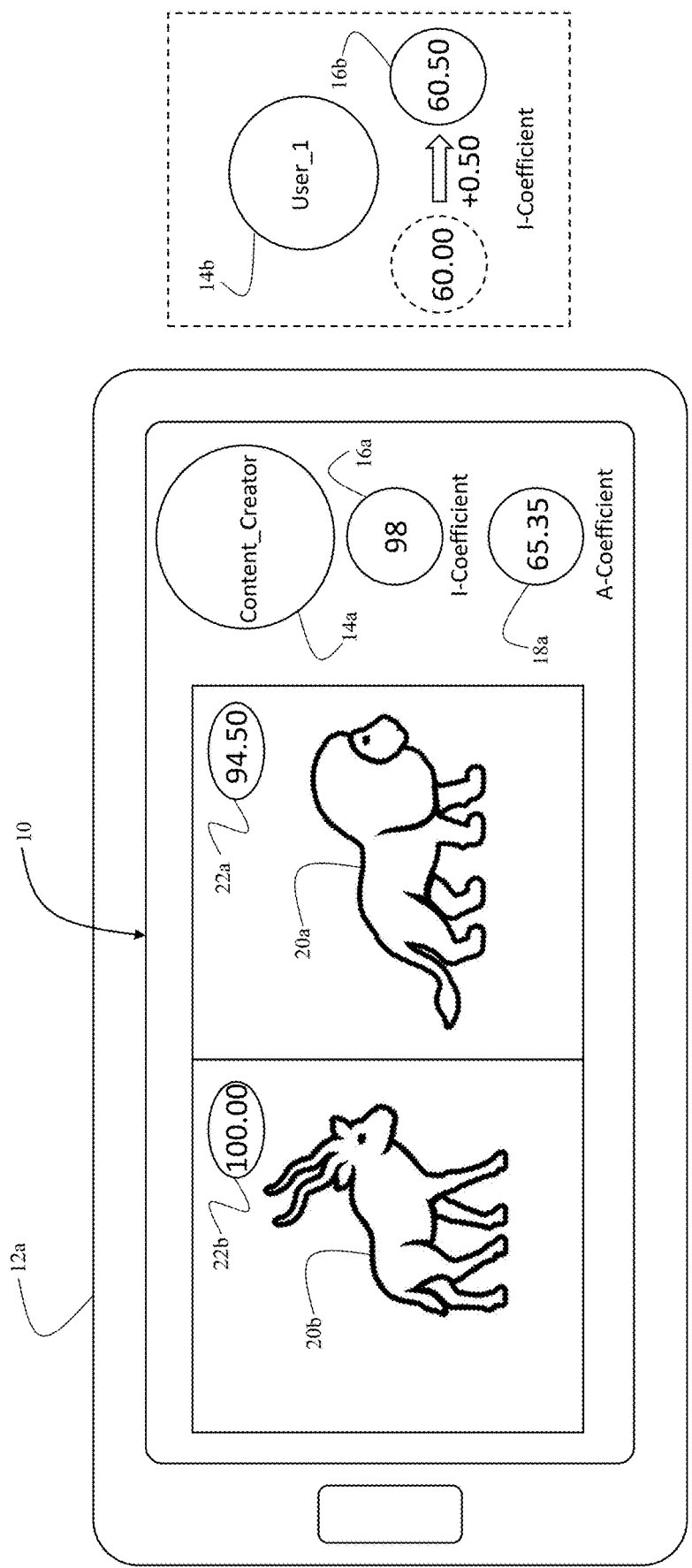
FIG. 2E schematically depicts the first computing device displaying an updated dynamic image quality indicator for the digital photograph and also depicts the coefficient associated with the first user being updated responsive to an input from the second user.

FIG. 2E depicts automatic updates of dynamic quality indicator 22b of digital photograph 20b and I-Coefficient 16b of User_1 who has provided a previous input responsive to digital photograph 20b. Based on an exemplary algorithm described above, responsive to third computing device 12c detecting first predefined input 26 from User_2, dynamic quality indicator 22b of digital photograph 20b is increased by the value of I-Coefficient 16c of User_2. Thus, dynamic quality indicator 22b is increased from its previous value of "60.00" to "100.00." At this point, dynamic quality indicator 22b of digital photograph 20b exceeds dynamic quality indicator 22a of digital photograph 20a. In an embodiment, the graphic user interface of application 10 is configured to rearrange digital photographs 20a and 20b such that they are displayed based on their dynamic quality indicators 22a and 22b. Also, because dynamic quality indicator 22a of digital photograph 20b increased, A-Coefficient 18a of Content-_Creator has also been automatically increased.

FIG. 2E further depicts that, responsive to third computing device 12c detecting first predefined input 26 to digital photograph 20b from User_2, I-Coefficient 16b of User_1 dynamically changes. An algorithm for automatically updating I-Coefficients of every user that has responded to a digital photograph prior to the most recent user response is used to calculate current I-Coefficients for those users. When one of the plurality of computing devices 12 detects either a first predefined input 26 or a second predefined input 28 responsive to a particular digital media object, the system automatically recalculates I-Coefficient 16 of every user 14 that has previously provided input for that digital media object.

Every time a user endorses or rejects a digital media object, that input affects I-Coefficient of every user that has previously rejected or endorsed that digital media object. In an embodiment, the algorithm for updating I-Coefficients accounts for at least the following two factors: (1) the quantity of users that have previously provided input for digital media object and (2) whether the previous input matches the most current input. For example, a user is the $i^{th}$ user to provide input to a digital media object. If the $i^{th}$ user provides a first predefined input 26 endorsing digital media object, then I-Coefficient of every user that has previously provided first predefined input endorsing that digital media object will increase by 1/i points, while I-Coefficient of every user that has previously provided second predefined input 28 rejecting that digital media object will decrease by 1/i points.

On the other hand, if the $i^{th}$ user provides a second predefined input 28 rejecting digital media object 20, then I-Coefficient of every user that has previously provided first predefined input 26 endorsing digital media object 20 will decrease by 1/i points, while I-Coefficient of every user 14 that has previously provided second predefined input 28 rejecting digital media object 20 will increase by w/i points. Thus, the earlier a user provides his/her input to the digital media object, the greater the impact of the user's input on I-Coefficients of all prior users. Likewise, if a digital media object has already received input from a large number of users, subsequent inputs will have less impact on I-Coefficients of previous users.

Next aspect of the exemplary algorithm explained above is that the increase for I-Coefficients is generally greater for matching second predefined inputs 28 rejecting a digital media object than for matching first predefined inputs 26 endorsing the digital media object. In the preceding paragraph, governing coefficient w was introduced. In an embodiment, the governing coefficient w is a factor of a user's input history. One exemplary method for calculating the governing coefficient w is calculating a ratio of a total quantity of endorsements a user provided to a total quantity of rejections the user provided. Because endorsements tend to be more prevalent than rejections, governing factor w effectively attributes more weight to matching rejections than matching endorsements. The governing coefficient w is calculated on a per-user basis. Thus, if rejections are rare relative to endorsements across the system, then the governing coefficient w will be significant.

Simply stated, the governing factor w establishes a self-limiting loop that controls the impact of matching rejections. If the systemwide rejections are rarer than endorsements, then I-Coefficients of users who have rejected a particular digital media object will be increased by a greater value in response to subsequent rejections from other users, than the potential value of increase for matching endorsements or the value of decrease for non-matching responses. As the systemwide number of rejections relative to endorsements increases, subsequent matching rejections become less impactful due to a deteriorating governing coefficient w. In an embodiment, the governing coefficient w can be such that it cannot exceed a predefined value, for example, "1."

In an embodiment, the numerical impact on an I-Coefficient for a matching or mismatching response is calculated using the following equation:

$$y = \left(\frac{w}{x*a}\right) \pm b,$$

where w is the governing factor discussed above, x is the total number of responses to the digital media object preceding the current response, a is convexity, and b is steepness. This equation is merely exemplary.

Returning to the example of FIGS. 1A-K, FIG. 2E depicts that responsive to third computing device 12c detecting first predefined input 26 from User_2, I-Coefficient of User_1 is automatically updated according to the automated learning feedback loop discussed above. In FIG. 2B, User_1 provided input to digital photograph 20b, and, subsequently, in FIG. 2D, User_2 also provided input to digital photograph 20b. Input from User_2 generates a change in I-Coefficient 16b score of User_1. Because both User_1 and User_2 endorsed digital photograph 20b by responding thereto with first predefined inputs 26 (swipe right), I-Coefficient 16b of User_1 increases. The amount of increase is calculated as follows: because both users provided first predefined inputs 26, I-Coefficient 16b of User_1 increases by 1/i, where i=2 because User_2 was the second user to provide input for digital photograph 20b. Thus, as shown in FIG. 2E, I-Coefficient of User_1 is automatically increased by 0.50, from 60.00 to 60.50. Now, when User_1 provides subsequent input on other digital photographs, dynamic quality indicator will be of those photographs will be calculated using the updated I-Coefficient for User_1.

Figure 2F:
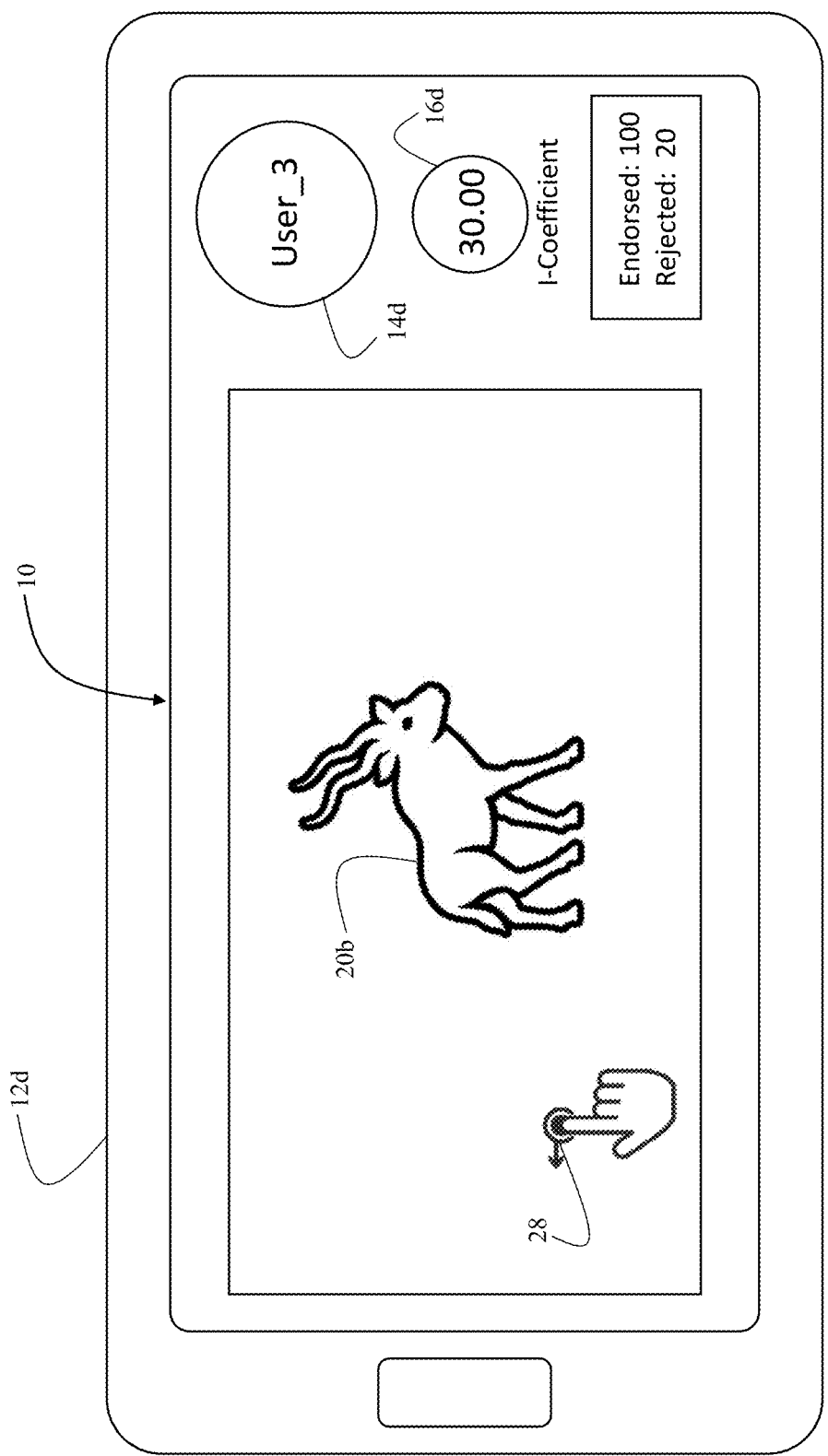
FIG. 2F schematically depicts a fourth computing device displaying the digital photograph and configured to receive a predefined input from a third user in response thereto.

Referring to the next figure in the sequence for this example, FIG. 2F, photograph 20b is displayed on a fourth computing device 12d to User_3 (14d). User_3 has I-Coefficient 16d of "30.00." Fourth computing device 12d detects second predefined input 28 responsive to digital photograph 20*b*. Because second predefined input 28 rejects digital photograph 28, the dynamic quality indicator 22*b* of digital photograph 20*b* automatically decreases by current value of User_3's I-Coefficient 16*d*. Thus, the dynamic quality indicator 22*b* of digital photograph 20*b* is decreased by 30.00 from a previous value of "100.00" to a new value of "70.00," as depicted in FIG. 2G.

Figure 2G:
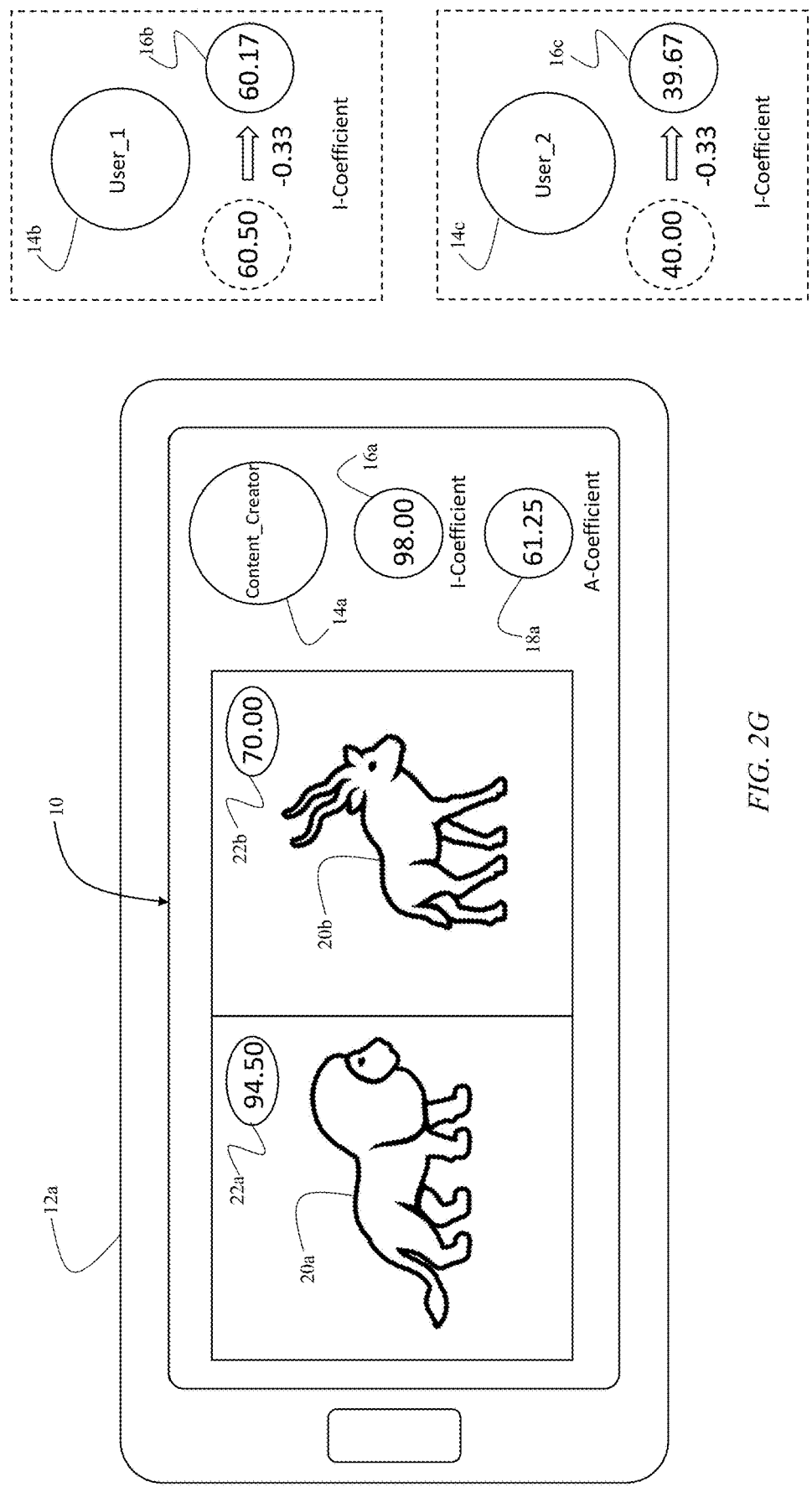
FIG. 2G schematically depicts the first computing device displaying an updated dynamic image quality indicator for the digital photograph and also depicts the coefficients associated with the first and second users being updated responsive to an input from the third user.

FIG. 2G further depicts that the graphic user interface of application 10 automatically rearranges digital photographs 20*a* and 20*b* in the order of their respective dynamic quality indicators 22*a* and 22*b*. Because the latest change in dynamic quality indicator 22*b*, responsive to User_3 input, decreased the value of dynamic quality indicator 22*b* below the value of dynamic quality indicator 22*a*, digital photograph 20*a* is displayed first on the graphic user interface. Another automated consequence of decreased dynamic quality indicator 22*a* is a decrease in A-Coefficient 18*a* of Content_Creator.

Continuing reference to FIG. 2G, second predefined input 28 from User_3 detected by fourth computing device 12*d* also has an automatic impact on I-Coefficients of all prior users who have provided input to that photo—i.e., User_1 and User_2. Because User_3 rejected digital photograph 20*b*, while User_1 and User_2 endorsed it, I-Coefficients of User_1 and User_2 are automatically decreased. The value of decrease is calculated based on the principles described above. Because User_3 is the third user providing input for digital photograph 20*b*, the impact value for I-Coefficients for User_1 is $$\frac{1}{i} = \frac{1}{3} = 0.33.$$

FIG. 2G depicts that I-Coefficient 16*b* of User_1 was decreased by −0.33 from 60.50 to 60.17, and I-Coefficient 16*c* of User_2 was also decreased by −0.33 from 40.00 to 39.67. Subsequent input from User_1 and User_2 to digital photographs will affect dynamic quality indicators thereof based on the new updated I-Coefficients 16*b* and 16*c*.

Figure 2H:
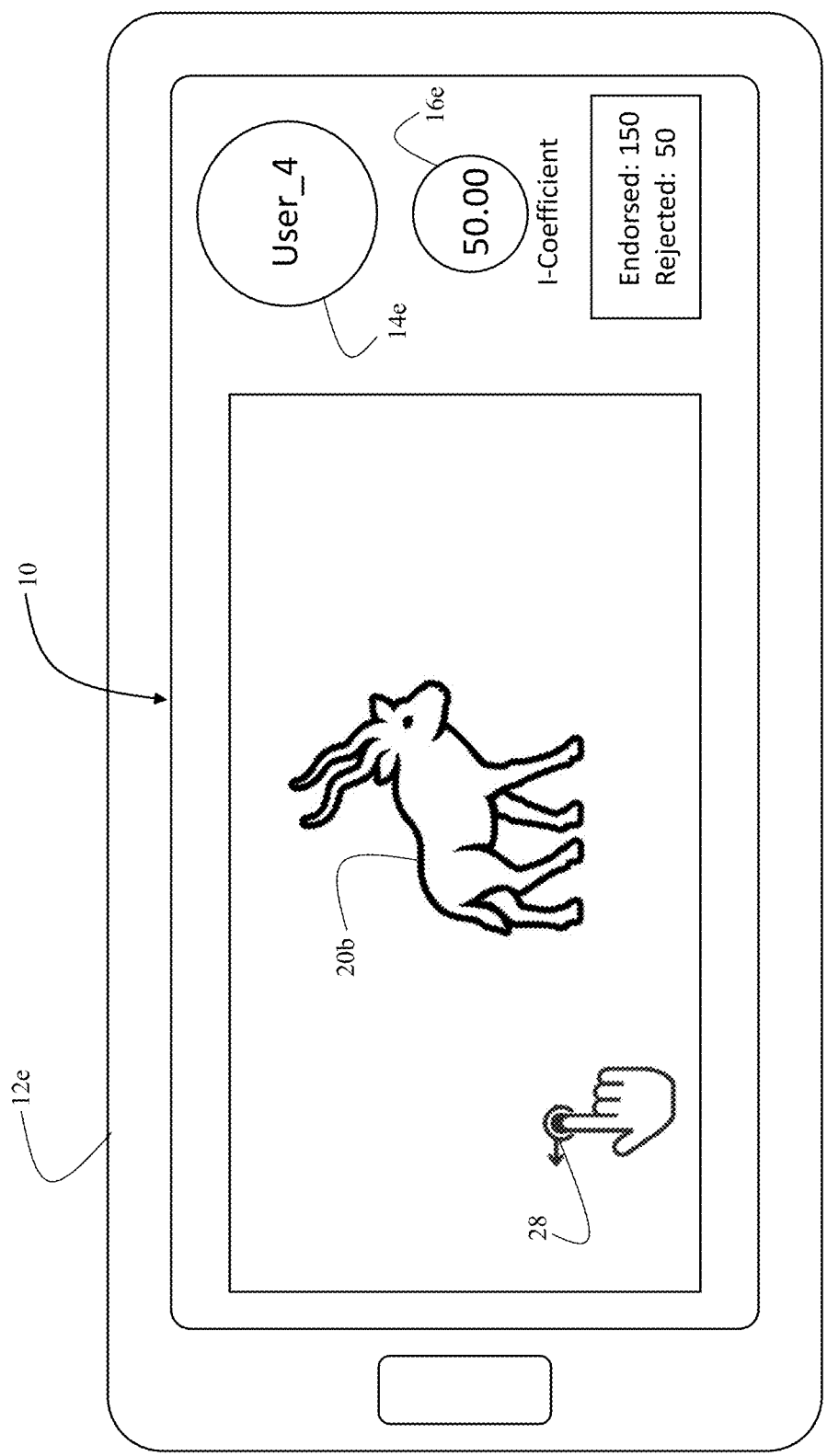
FIG. 2H schematically depicts a fifth computing device displaying the digital photograph and configured to receive a predefined input from a fourth user in response thereto.

Referring now to FIG. 2H, a fifth computing device 12*e* displays second digital photograph 20*b* to User_4 (14*e*). Fifth computing device 12*e* receives second predefined input 28 from User_4 indicating rejection of digital photograph 20*b*. The input received from User_4 affects dynamic quality indicator 22*b* of digital photograph 20*b* and also affects I-Coefficients of every user that has previously provided input for digital photograph 20*b*—i.e., User_1, User_2, and User_3. These changes are shown in FIG. 2I.

Figure 2I:
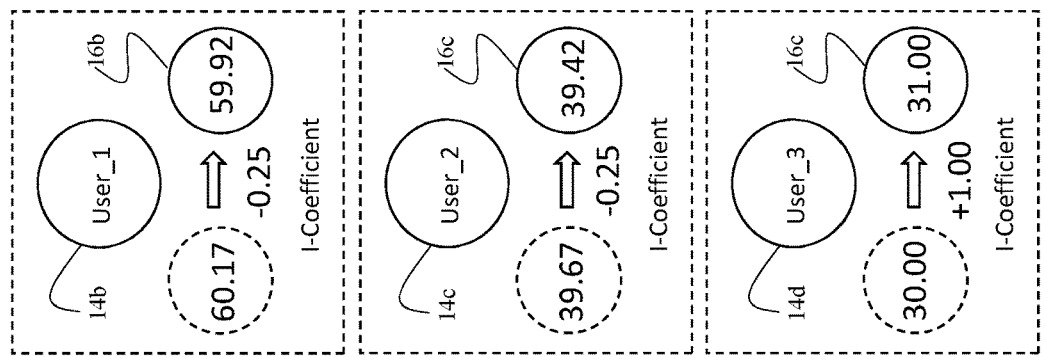
FIG. 2I schematically depicts the first computing device displaying an updated dynamic image quality indicator for the digital photograph and also depicts the coefficients associated with the first, second, and third users being updated responsive to an input from the fourth user.
Figure 2I:
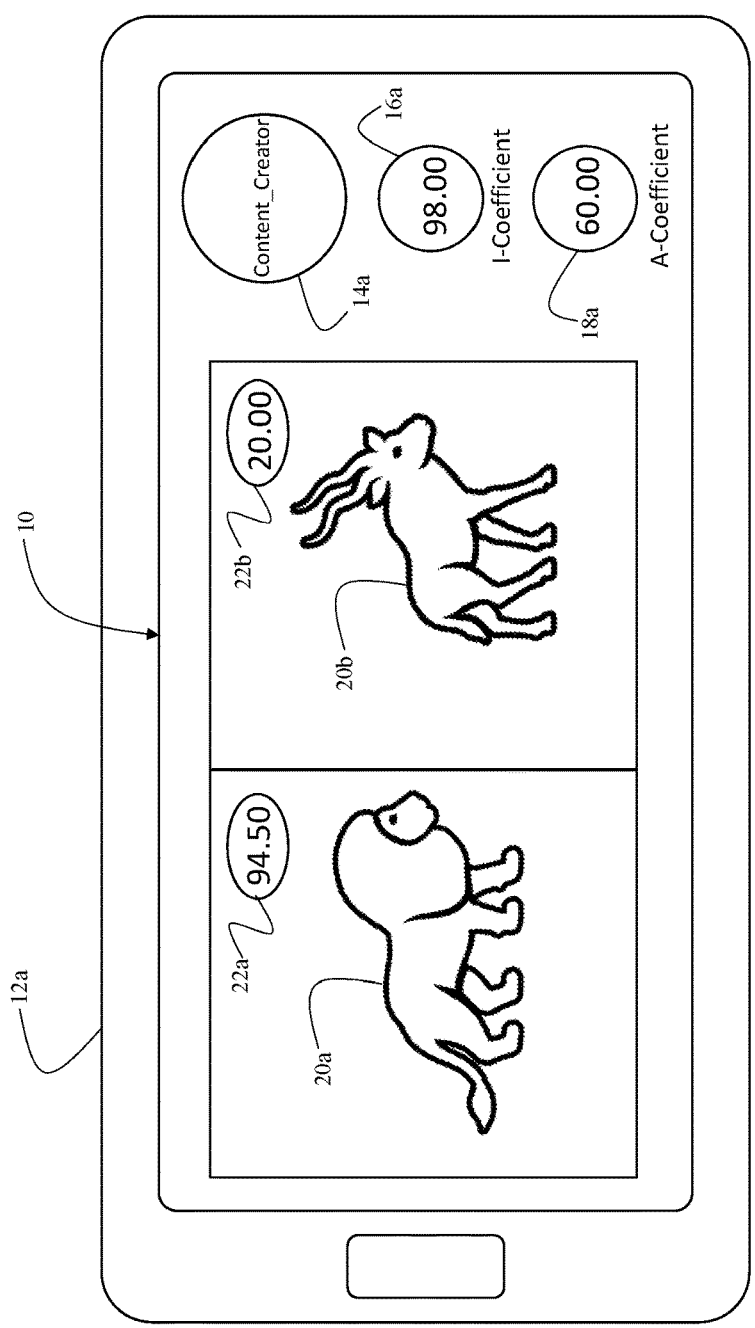

Referring to FIG. 2I, responsive to fifth computing device 12*e* detecting second predefined input 28 from User_4, dynamic quality indicator 22*b* of digital photograph 20*b* is automatically changed. Because User_4 has I-Coefficient 16*e* of 50.00, dynamic quality indicator 22*b* decreases by that value and changes from 70.00 to 20.00. Consequently, Content_Creator's A-Coefficient 18*a* also decreases.

Next, FIG. 2I depicts how I-Coefficients 16*b*, 16*c*, and 16*d* corresponding to User_1, User_2, and User_3 are automatically updated responsive to input from User_4. Because User_1 and User_2 endorsed digital photograph 20*b*, while User_4 rejected it, their predefined inputs mismatch and, therefore, I-Coefficients 16*b* and 16*c* of User_1 and User_2 are automatically decreased. The value of decrease is calculated based on a number of total inputs for digital photograph 20*b* prior to User_4. User_4 was the fourth user to respond to digital photograph 20*b* and, therefore, decrease value is calculated as $$\frac{1}{i} = \frac{1}{4} = 0.25.$$

FIG. 2I depicts that I-Coefficient 16*b* of User_1 is automatically decreased from 60.17 to 59.95, and I-Coefficient 16*c* of User_2 is automatically decreased from 39.67 to 39.42.

FIG. 2I also illustrates that because both User_3 and User_4 provided second predefined input 28 responsive to digital photograph 20*b*, I-Coefficient 16*d* of User_3 is automatically increased. As explained above, in an embodiment, the system is configured to employ governing value w for calculation of I-Coefficients in scenarios where users provide matching negative responses to a digital photograph. FIGS. 2B, 2D, 2F, and 2H show that User_1 has 98 endorsements and 32 rejections, User_2 has 104 endorsements and 11 rejections, User_3 has 100 endorsements and 20 rejections, and User_4 has 150 endorsements and 50 rejections. Based on these numbers, systemwide governing value w is calculated as follows:

$$\frac{98+104+100+150}{32+11+20+50} = \frac{452}{113} = 4.$$

Next, the increase value for I-Coefficient 16*d* of User_3 is calculated as follows $$\frac{w}{i} = \frac{4}{4} = 1.$$

FIG. 2H indicates that I-Coefficient 16*d* of User_3 is automatically increased from 30.00 to 31.00. In this case, the absolute value of impact of matching negative responses is four times greater than the impact of mismatching responses or matching positive responses.

Figure 2J:
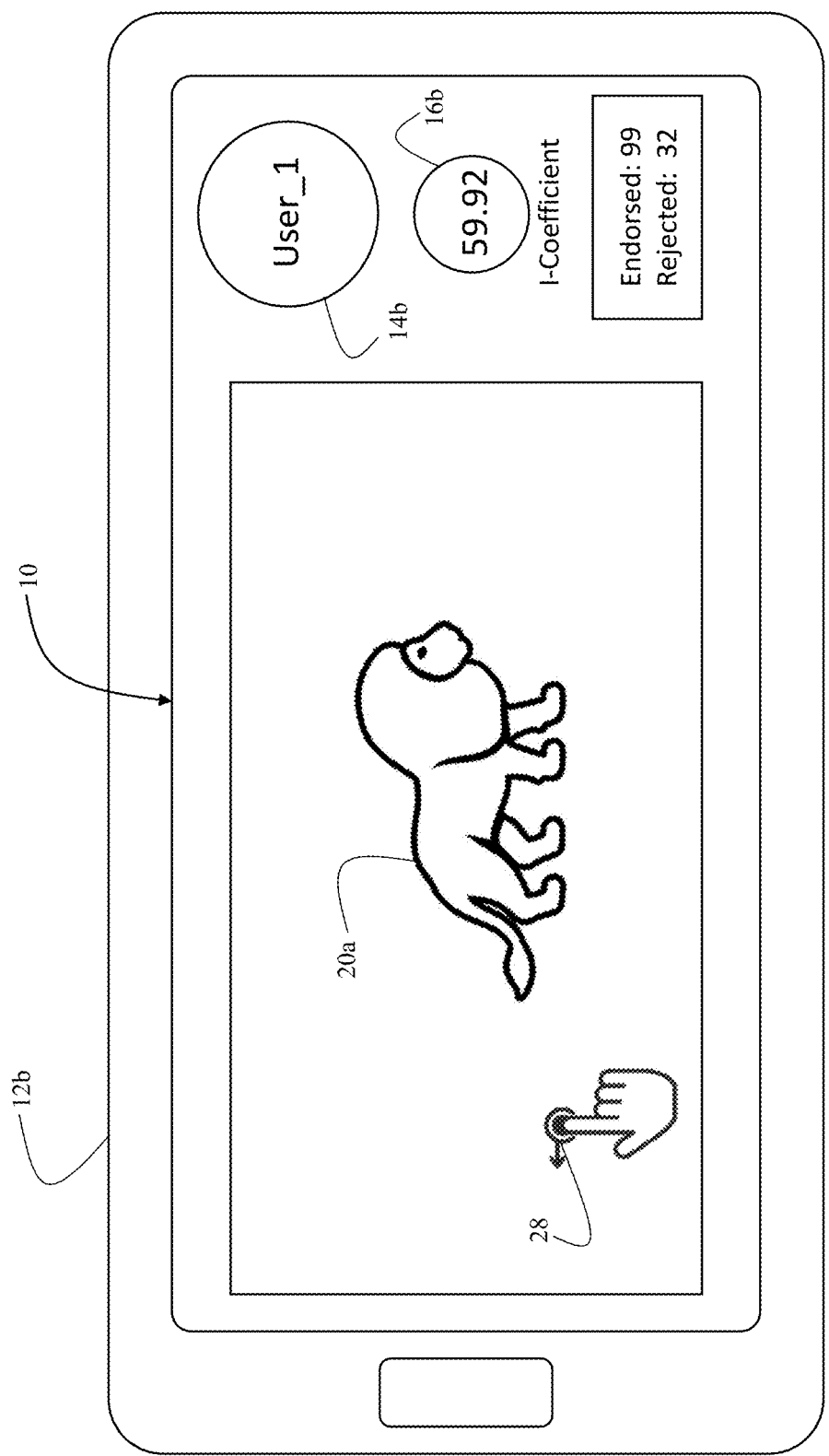
FIG. 2J schematically depicts the second computing device displaying a second digital photograph and configured to receive a predefined input from the first user in response thereto.
Figure 2K:
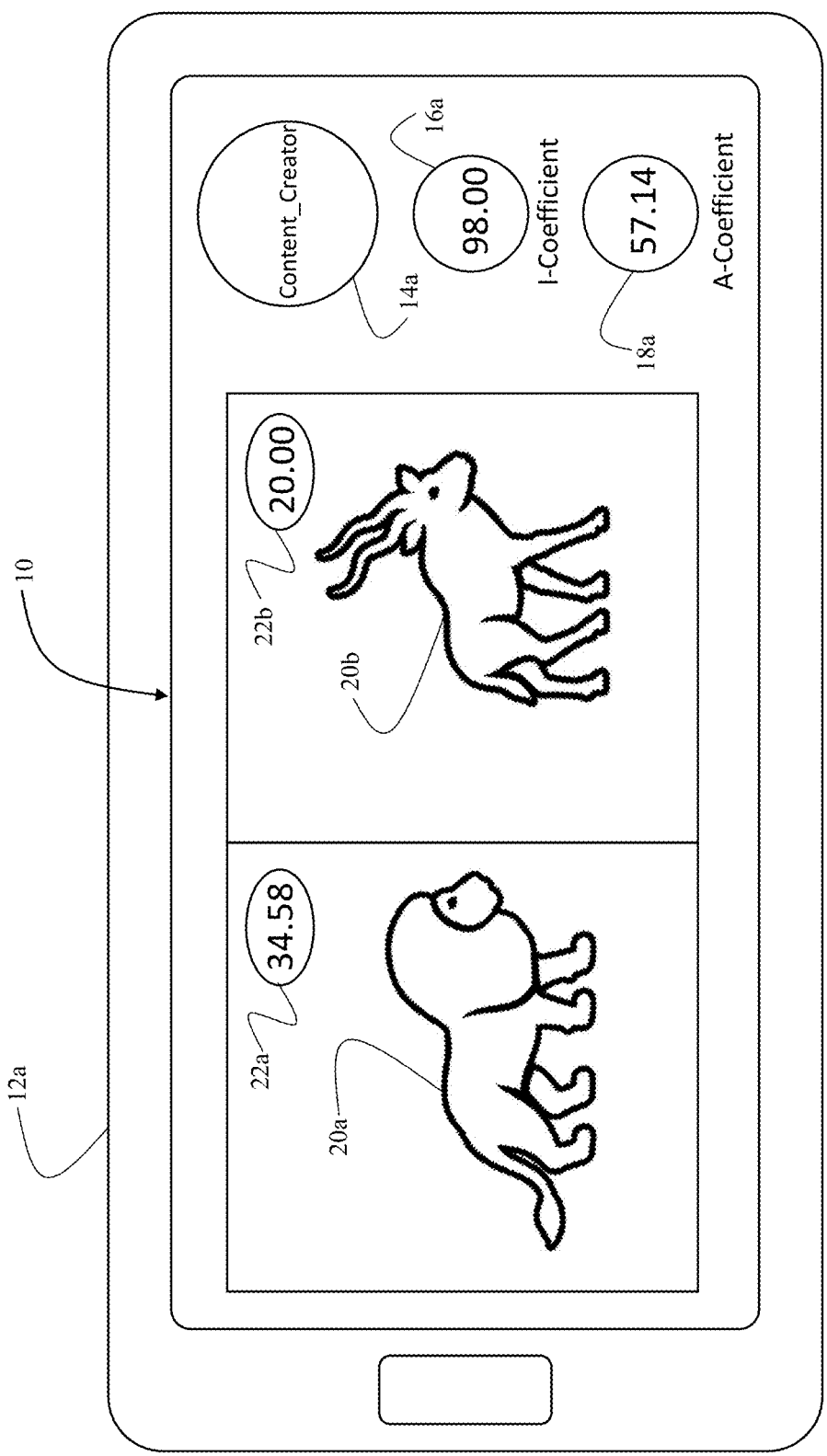
FIG. 2K schematically depicts the first computing device displaying an updated dynamic image quality indicator for the second digital photograph subsequent to receiving an input from the first user, the updated dynamic image quality indicator being generated based on the current value of the coefficient associated with the first user.

FIG. 2J depicts second computing device 12*b*, which now displays first digital photograph 20*a*. FIG. 2J postdates events depicted in preceding FIGS. 1A-I. Subsequent to User_1 providing first predefined input 26 for digital photograph 20*b* in FIG. 2B, I-Coefficient 16*b* of User_1 has undergone a series of automatic changes based on subsequent responses to digital photograph 20*b* provided by User_2, User_3, and User_4. In response to those changes, User_1 has a new current I-Coefficient 16*b* of 59.92. FIG. 2J depicts that, responsive to digital photograph 20*a* being displayed on a second computing device 12*b*, User_1 provides second predefined input 28 indicating rejection of digital photograph 20*a*. Dynamic quality indicator 22*a* of digital photograph 20*a* is updated based on the current value of I-Coefficient 16*b* of User_1. FIG. 2K depicts that dynamic quality indicator 22*a* has decreased from its previous value of 94.50 to 34.58. Consequently, A-Coefficient 18*a* of Content_Creator has also decreased. I-Coefficient 16*a* of Content_Creator, however, has remained unchanged throughout the events depicted in FIGS. 1A-K because, in this example, Content_Creator has not provided his input responsive to digital photographs 20*a* and 20*b*.

FIG. 3 is a flowchart schematically depicting the sequence of steps for interactively displaying a digital photograph on a plurality of computing device and automatically updating a dynamic quality indicator associated with the digital photograph based on predefined inputs from multiple users. In step 102, a digital media object is displayed on a first computing device to a first user. The digital media object has a dynamic quality indicator associated therewith. In step 104, the first computing device receives an input from the first user responsive to the displayed digital media object. In step 106, a determination is made as to whether the input corresponds to a positive response endorsing the displayed digital media object or a negative response rejecting the displayed digital media object. If the input corresponds to a positive response, then, in step 108, the dynamic quality indicator of the first digital media object is increased, wherein the increase value is calculated based on a coefficient associated with a first user. On the other hand, if the input corresponds to a negative response, the dynamic quality indicator is automatically decreased, wherein the decrease value is also calculated based on the coefficient associated with the first user.

Next, in step 112, the same digital media object is displayed on the second computing device to a second user. In step 114, the second user provides a predefined input responsive to the display digital media object. In step 116, it is determined whether the second user's input corresponds to a positive or a negative response. If the input corresponds to a positive response, the dynamic quality indicator is increased by a value calculated based on a coefficient associated with a second user in step 118. Otherwise, if the input corresponds to a negative response, the dynamic quality indicator of the displayed digital media object is decreased by a value calculated based on the coefficient associated with the second user in step 120. In step 122, the input received by the first computing device from the first user responsive to the displayed digital media object is compared against the input received by the second computing device from the second user. If the inputs match, the coefficient associated with the first user is increased in step 124. However, if the inputs do not match, the coefficient associated with the first user is decreased in step 126. Step 128 indicates that the value of the increase or decrease of the first user's coefficient is inversely related to a quantity of users that responded to the digital media object prior to the second user. For example, if the second user is a $100^{th}$ user to respond to the digital media object the coefficient of the first user will be impacted greater than if the second user is $200^{th}$ user responding to the digital media object.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic, Swift, Python, Ruby or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of interactively outputting digital media objects on a plurality of computing devices and dynamically calculating quality indicators associated therewith, the method comprising:

outputting a first digital media object on a first computing device, the first digital media object having a first dynamic quality indicator associated therewith, wherein the first computing device has an input detection mechanism configured to detect a plurality of predefined inputs;

receiving a first predefined input or a second predefined input from a first user, the first predefined input being in response to the first digital media object outputted on the first computing device, wherein the first user has an initial coefficient value associated therewith;

responsive to receiving the first predefined input from the first user, increasing the first dynamic quality indicator of the first digital media object based on the initial coefficient value associated with the first user, or, responsive to receiving the second predefined input from the first user, decreasing the first dynamic quality indicator of the first digital media object based on the initial coefficient value associated with the first user;

subsequent to increasing or decreasing the first dynamic quality indicator of the first digital media object, outputting the first digital media object on a second computing device, wherein the second computing device is configured to detect at least the first predefined input and the second predefined input from a second user;

receiving the first predefined input or the second predefined input from the second user in response to the first digital object outputted on the second computing device;

responsive to receiving the first or the second predefined input from the second user calculating an updated coefficient value for the first user, wherein the updated coefficient value is greater than the initial coefficient value if the first user and the second user both responded to the first digital media object with the first predefined input or both responded with the second predefined input;

outputting a second digital media object on the first computing device, the second digital media object having a second dynamic quality indicator associated therewith;

receiving the first predefined input or the second predefined input from the first user in response to the second digital media object; and responsive to receiving the first predefined input in response to the second digital media object, increasing the second dynamic quality indicator based on the updated coefficient value of the first user, or, responsive to receiving the second predefined input, decreasing the second dynamic quality indicator based on the updated coefficient value of the first user.

2. The method of claim 1, wherein the first predefined input is a positive response and the second predefined input is a negative response.

3. The method of claim 1, wherein the updated coefficient value is lower than the initial coefficient value if the second computing device and the first computing device received nonmatching predefined inputs responsive to the first digital media object being displayed thereon.

4. The method of claim 2, wherein the updated coefficient value exceeds the initial coefficient value by a first value responsive to the first user and the second user both providing positive responses to the first digital media object, and wherein the updated coefficient value exceeds the initial coefficient value by a second value responsive to both the first user and the second user providing negative responses to the first digital media object, the second value being greater than the first value.

5. The method of claim 4, wherein the first value or the second value is calculated based on a quantity of responses to the first digital media object from other users prior to the second user providing the first or the second predefined input responsive to the first digital media object.

6. The method of claim 5, wherein the first value or the second value is inversely proportional to a total number of users providing the positive or the negative response to the first digital media object prior to the positive or the negative response provided thereto by the second user.

7. The method of claim 4, wherein the second value is calculated based on cumulative positive and negative responses provided by the second user to a plurality of digital media object.

8. The method of claim 7, wherein the second value is calculated by obtaining a ratio of the cumulative systemwide positive responses to the cumulative systemwide negative responses to the plurality of digital media objects, and dividing the ratio by a total number of users providing the positive or the negative response to the first digital media object prior to the positive or the negative response thereto provided by the second user.

9. The method of claim 1, wherein the first dynamic quality indicator is increased responsive to a first predefined response from the second user to the first digital media object, and wherein the first dynamic quality indicator is decreased responsive to the second predefined response from the second user to the first digital media object.

10. The method of claim 9, wherein the first dynamic quality indicator of the first digital media object is increased or decreased based on a second user coefficient.

11. A graphic user interface for displaying digital media objects on a computing device, comprising:
a plurality of digital media objects displayed on a display screen of a first computing device, the plurality of digital media object comprising at least a first digital media object and a second digital media object, wherein the first digital media object has an initial first dynamic quality indicator associated therewith and the second digital media object has an initial second dynamic quality indicator associated therewith, the initial first dynamic quality indicator being greater than the initial second dynamic quality indicator, whereby the first and the second digital media object are arranged on the display screen of the first computing device based on relative values of the initial first and second dynamic quality coefficients, wherein the initial second dynamic quality indicator is automatically updated responsive to an instruction received by the first computing device via a network connection, wherein the instruction to update the initial second dynamic quality indicator is issued responsive to the steps comprising:
displaying the second digital media object on a second computing device;
receiving an input from a first user via the second computing device responsive to the second digital media object being displayed thereon, the input being selected from the group consisting of a first or a second predefined input, wherein the first user has a coefficient value associated therewith;
responsive to the input received from the first user, generating an updated second dynamic quality indicator for the second digital media object based on the coefficient value of the first user, wherein the updated second dynamic quality indicator is greater than the initial second dynamic quality indicator responsive to the input being the first predefined input;

wherein the coefficient value associated with the first user is increased or decreased in response to a second user input to the second digital media object when the second digital media object is displayed on a third computing device; and automatically rearranging the first and the second digital media objects on the display screen of the first computing device responsive to the updated second dynamic quality indicator being greater than the initial first dynamic quality indicator.

12. The graphic user interface of claim 11, wherein the first predefined input is a positive response and the second predefined input is a negative response.

13. The graphic user interface of claim 12, wherein the coefficient value of the first user is increased by a first value responsive to the first user and the second user both providing positive responses to the second digital media object.

14. The graphic user interface of claim 13, wherein the coefficient value of the first user is increased by a second value responsive to both the first user and the second user providing negative responses to the second digital media object.

15. The graphic user interface of claim 14, wherein the second value is greater than the first value.

16. The graphic user interface of claim 14, wherein the first value or the second value is calculated based on a quantity of responses to the second digital media object from other users prior to the second user providing the first or the second predefined input in response thereto.

17. The graphic user interface of claim 14, wherein the first value or the second value is inversely proportional to a total number of users providing the positive or the negative response to the second digital media object prior to the second user input.

18. The graphic user interface of claim 14, wherein the second value is calculated based on cumulative positive and negative responses systemwide to a plurality of digital media objects.

19. The graphic user interface of claim 18, wherein the second value is calculated by obtaining a ratio of the cumulative positive responses to the cumulative negative responses systemwide, and dividing the ratio by a total number of users providing the positive or the negative response to the second digital media object prior to the second user input in response to the second digital media object.

* * * * *